US008644620B1

(12) United States Patent
Lam

(10) Patent No.: US 8,644,620 B1
(45) Date of Patent: Feb. 4, 2014

(54) PROCESSING OF MATCHING REGIONS IN A STREAM OF SCREEN IMAGES

(75) Inventor: Hin Chung Lam, Seattle, WA (US)

(73) Assignee: Google Inc., Mountain View, CA (US)

( * ) Notice: Subject to any disclaimer, the term of this patent is extended or adjusted under 35 U.S.C. 154(b) by 159 days.

(21) Appl. No.: 13/165,445

(22) Filed: Jun. 21, 2011

(51) Int. Cl.
*G06K 9/62* (2006.01)

(52) U.S. Cl.
USPC .......................................................... 382/209

(58) Field of Classification Search
None
See application file for complete search history.

(56) References Cited

U.S. PATENT DOCUMENTS

| | | | | |
|---|---|---|---|---|
| 5,164,998 | A | 11/1992 | Reinsch | |
| 5,699,128 | A | 12/1997 | Hayashi | |
| 6,519,287 | B1 | 2/2003 | Hawkins et al. | |
| 7,647,331 | B2 | 1/2010 | Li et al. | |
| 2003/0147548 | A1* | 8/2003 | Ruhl et al. | 382/100 |
| 2004/0025025 | A1* | 2/2004 | Venkatesan et al. | 713/176 |
| 2005/0069171 | A1* | 3/2005 | Rhoads et al. | 382/100 |
| 2005/0094847 | A1* | 5/2005 | Venkatesan et al. | 382/100 |
| 2006/0046713 | A1* | 3/2006 | Yokota et al. | 455/426.1 |
| 2006/0165283 | A1* | 7/2006 | DeWitt et al. | 382/173 |
| 2006/0279628 | A1* | 12/2006 | Fleming | 348/143 |
| 2007/0274611 | A1* | 11/2007 | Rodriguez et al. | 382/317 |
| 2008/0133921 | A1* | 6/2008 | Yao | 713/175 |
| 2008/0141033 | A1* | 6/2008 | Ginter et al. | 713/175 |
| 2008/0288509 | A1 | 11/2008 | Mysen et al. | |
| 2009/0228534 | A1* | 9/2009 | Hirsch et al. | 707/204 |
| 2010/0250488 | A1* | 9/2010 | Mayer et al. | 707/609 |
| 2011/0078458 | A1* | 3/2011 | Furukawa et al. | 713/189 |
| 2011/0158146 | A1* | 6/2011 | Poola et al. | 370/312 |

OTHER PUBLICATIONS

"MPEG Encoding Basics", Snell & Wilcox, 2002, 7 pages.

* cited by examiner

*Primary Examiner* — Stephen R Koziol
*Assistant Examiner* — Delomia Gilliard
(74) *Attorney, Agent, or Firm* — Brake Hughes Bellermann LLP

(57) ABSTRACT

In one general aspect, a computer-readable storage medium can be configured to store instructions that when executed cause a host device to perform a process. The instructions can include instructions to calculate a set of hash values associated with a set of blocks of a first image, and calculate a hash value associated with a block of a second image. The instructions can include instructions to receive an indicator that the hash value of the block of the second image matches a hash value from the set of hash values associated with the first image, and designate, in response to the indicator, the block of the second image for duplication.

20 Claims, 12 Drawing Sheets

| X,Y | Hash Value |
| --- | --- |
| 0,0 | Q41B |
| 0,1 | H5T2 |
| 0,2 | Y7P1 |
| .... | |
| 2,0 | M323 |
| 3,1 | 16YE |
| 3,2 | A17R |
| .... | |
| 9,10 | AQ70 |
| 9,11 | PO72 |
| 9,12 | UTA3 |

FIG. 6G

| X,Y | Hash Value |
| --- | --- |
| 0,0 | O47W |
| 0,1 | 4KR2 |
| 0,2 | 8SH5 |
| .... | |
| 2,3 | Q41B |
| 2,4 | H5T2 |
| 2,5 | Y7P1 |
| .... | |
| 9,10 | S5IO |
| 9,11 | AAW5 |
| 9,12 | 5H89 |

FIG. 6H

PROCESSING OF MATCHING REGIONS IN A STREAM OF SCREEN IMAGES

TECHNICAL FIELD

This description relates to processing of matching regions in a stream of images.

BACKGROUND

A client device can be used to interact with an application operating at a host device via a remote desktop session. The host device can be configured to define a stream of screen images representing the interactions of the client device with the application, and can send the stream of screen images to the client device as the interactions are occurring via the remote desktop session. Although the host device can be configured to encode (e.g., compress) the screen images before sending the screen images to the client device where they are displayed, the compressed screen images can consume significant bandwidth over a connection between the client device and the host device. If the screen image updates consume too much bandwidth of the connection, interactions between the client device and the host device during a remote desktop session can be, for example, disrupted. Also, consumption of bandwidth for updates of the screen images at the client device can reduce the available bandwidth, which can already be limited, for other functions. Thus, a need exists for systems, methods, and apparatus to address the shortfalls of present technology and to provide other new and innovative features.

SUMMARY

In one general aspect, a computer-readable storage medium can be configured to store instructions that when executed cause a host device to perform a process. The instructions can include instructions to calculate a set of hash values associated with a set of blocks of a first image, and calculate a hash value associated with a block of a second image. The instructions can include instructions to receive an indicator that the hash value of the block of the second image matches a hash value from the set of hash values associated with the first image, and designate, in response to the indicator, the block of the second image for duplication.

In another general aspect, an apparatus can include a hash value calculator configured to calculate a set of hash values associated with a set of blocks of a first image, and configured to calculate a hash value associated with a block of a second image. The apparatus can include a hash value comparator configured to match the hash value of the block of the second image with a hash value from the set of hash values associated a block from the set of block values of the first image, and configured to identify the block of the second image as a matching block in response to the matching. The apparatus can also include an expansion module configured to increase a size of the matching block of the second image based on a comparison of pixel values outside of the matching block of the second image with pixel values outside of the block from the set of block values of the first image.

In yet another general aspect, a computer-readable storage medium can be configured to store instructions that when executed cause a host device to perform a process. The instructions can include instructions to calculate a first hash value of an image based on a block of pixel values of the image, and calculate a second hash value of the image based on a set pixel values vertically aligned and adjacent to the block of pixel values and based on the first hash value. The instructions can include instructions to calculate a third hash value of the image based on a set pixel values horizontally aligned and adjacent to the block of pixel values and based on the first hash value.

The details of one or more implementations are set forth in the accompanying drawings and the description below. Other features will be apparent from the description and drawings, and from the claims.

BRIEF DESCRIPTION OF THE DRAWINGS

FIGS. 6G and 6H illustrate tables of hash values related, respectively, to the prior image shown in FIG. 6A and the current image shown in FIGS. 6B and 6F.

DETAILED DESCRIPTION

Figure 1:
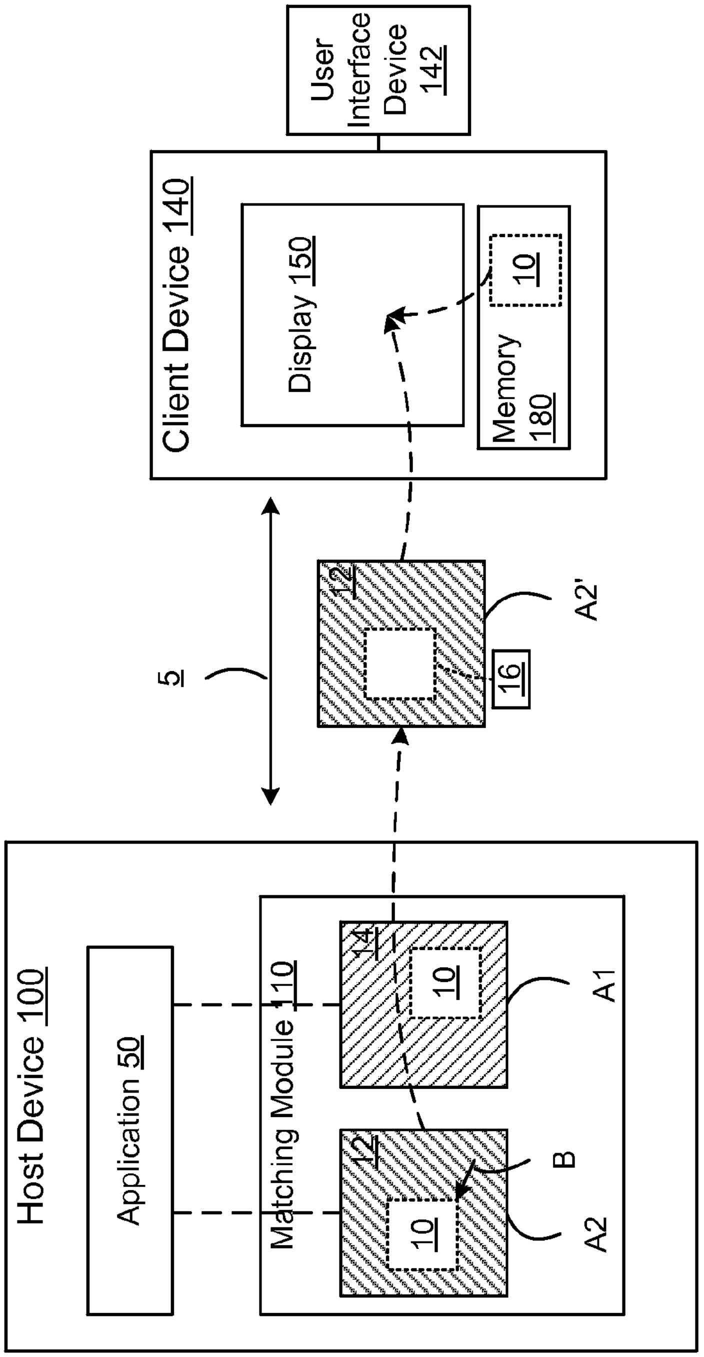
FIG. 1 is a diagram that illustrates a matching module associated with a host device and a client device.

FIG. 1 is a diagram that illustrates a matching module 110 associated with a host device 100 and a client device 140. The client device 140, in this embodiment, is configured to operate as a client (e.g., a thin client) of the host device 100 via, for example, a remote desktop session. The client device 140 can be used to interact with an application 50 operating at the host device 100 via a communication link 5, and the host device 100 can be configured to send to the client device 140 a stream of images (e.g., screen scrapes, screenshots) (also can be referred to as a stream of frames) representing responses to interactions with the application 50 during a remote desktop session. Accordingly, the processing resources of the host device 100 can be used by the client device 140 to operate the application 50 via the communication link 5 during the remote desktop session. In other words, the stream of images can be screenshots that are updated as the client device 140 is used to interact with the application 50 operating at the host device 100. In some embodiments, the communication link 5 can be, for example, a wireless communication link, a wired communication link, a network communication link, and/or so forth. As used herein, the term "remote desktop session" can include any technologies and/or protocols in which commands (e.g., input values) issued from a local client are used to control the functionality (e.g., operation) of a host device (e.g., host device 100) including, for example, Windows Remote Desktop™, Citrix™, WebEx™ etc. technologies and/or protocols.

For example, a user interface associated with the application 50 can be generated at the host device 100 operating the application 50. The client device 140 and/or a user interface device (e.g., a mouse device, a keyboard device, a touchpad device) coupled thereto can be used by a user to interact with the user interface of the application 50 via the communication link 5 during a remote desktop session. Images of the user interface, and interactions with the user interface (which can result in changes to the user interface), can be streamed, via the communication link 5, to the client device 140 where they can be displayed on the display 150. In some embodiments, the stream of images can, for example, define, or can be used to define, images in a video stream.

The matching module 110 of the host device 100 is configured to identify at least a portion (e.g., a block, a region) of a stream of images (sent from the host device 100 to the client device 140) that is duplicated within several images of the stream of images. The matching module 110 is configured to identify (e.g., identify based on hash values) regions that are duplicated within images of a stream of images sent from the host device 100 to client device 140 so that the image data sent from the host device 100 to client device 140 via the communication link 5 can be reduced by, for example, sending image data that includes encoding (e.g., compression) of only non-duplicated regions. The image data can include a relatively small amount of metadata (e.g., instructions, movement data), compared with encoded image data, that identifies the duplicated regions from previous images buffered at the client device 140 from the stream of images that can be reused at the client device 140 in subsequent images of the stream of images.

As a specific example, a word processing application (i.e., application 50) can be operating at the host device 100 and controlled at the host device 100 using the client device 140 during a remote desktop session. A user interface associated with the word processing application can be moved (e.g., dragged), without being modified, using a mouse device (not shown) of the client device 140. A stream of images (or images) of the movement of the user interface can be produced at the host device 100 using the word processing application and sent to the client device 140 for display on the display 150. Because the user interface is simply being moved (and is not modified), the representation of the user interface will be identical (e.g., duplicated) within each image of the stream of images except for x-y position of the user interface. Rather than entirely sending each of the images from the stream of images separately via the communication link 5, the matching module 110 can be used to characterize the movement of the user interface within the each of the images of the stream of images so that the user interface portion within each of the images will not have to be separately sent to the client device 140. Instead, only the portions of the images, such as background portions (which can be encoded) around the user interface, will be sent to (e.g., sent in a compressed form to) the client device 140. The user interface that is duplicated within each of the images may be sent to (and received at) the client device 140 once and reused at the client device 140 within each of the images (based on the characterization of the movement using, for example, metadata) as they are displayed at the client device 140.

As shown in FIG. 1, images A1, A2 can define at least a portion of an image stream sent from the host device 100 to the client device 140. As illustrated by the dashed lines, images A1, A2 can be associated with an application 50, which can be a word processing application, an operating system, a web browsing application, and/or so forth. For example, the images A1, A2 can be, or can include, at least a portion of a user interface (e.g., a desktop, a graphical user interface, an interactive interface) associated with the application 50. In some embodiments, the images A1, A2 can be associated with multiple applications (not shown) operating at the host device 100.

In this embodiment, the matching module 110 is configured to identify (e.g., determine) a region 10 (also can be referred to as a portion) that is included in both image A1 and image A2. The image A1 is an image produced prior to the image A2 within the image stream. Accordingly, the image A1 can be referred to as a previous or prior image (with respect to the image A2), and the image A2 can be referred to as a subsequent image (with respect to the image A1) or as a current image. As shown in FIG. 1, the matching module 110 is configured to identify (e.g., determine) that region 10 is duplicated within the current image A2 from the prior image A1 and identify (e.g., determine) that the region 10 is displaced within the current image A2 (from the prior image A1) by an offset value(s) (e.g., an offset value represented with x-y coordinates) represented by vector B.

When images are sent from the host device to the client device 140 via the communication link 5 as a stream of images, portions of the images (such as a portion of a user interface) that are duplicated within one another can be identified as having moved within (e.g., moved between) the images by an offset (e.g., an x-y offset) (or as remaining in the same position within images). In some embodiments, the movement of the duplicated portion between images can be characterized by movement data (e.g., metadata) that includes, for example, an offset value representing a vector (e.g., a magnitude and a direction) of the movement, a size of a block (e.g., region 10) that has moved, an original and/or target location of a block that has moved, and/or so forth.

Specifically, as shown in FIG. 1, only the portions 12 (or copies thereof) outside of the region 10 in the image A2 are sent to the client device 140 (shown as image A2') because the region 10 included in the image A2 is duplicated (but offset) from the image A1. The image A2' is represented within FIG. 1 as being in transit from the host device 100 to the client device 140 via the communication link 5. Rather than being sent via the communication link 5, the region 10 can be identified as a portion that has shifted within the image A2 from the prior image A1 by an offset (represented by vector B). Movement data 16, which is associated with image A2', characterizes the movement of the region 10 from the image A1. A copy of the region 10, which can be stored (e.g., cached, temporarily stored) within a memory 180 of the client device 140 can be inserted, based on the movement data 16, for display within the image A2' when received at the client device 140. The region 10, which is stored within the memory 180, can be from a prior image (e.g., image A1 or an earlier image) displayed at the display 150 of the client device 140. Thus, the movement data 16 can be defined as an instruction configured to trigger access, from the memory 180 at the client device 140, a copy of the region 10 to be reused from a prior image in response to the designation of the region 10 for duplication. Although not represented in FIG. 1, in some embodiments, the region 10 stored in the memory 180 can be an encoded (e.g., compressed) version of the region 10.

In some embodiments, the images A1, A2 can be, for example, bitmaps. Accordingly, the matching module 110 can be configured to process bitmaps of the images A1, A2 to determine whether or not the images A1, A2 have matching regions. In some embodiments, the matching module 110 can be configured to calculate hash values based on blocks of the images A1, A2 to determine whether or not one or more blocks of the images A1, A2 are identical (e.g., match). Accordingly, matching regions can be identified by the matching module 110 based on a block-by-block comparison. The matching module 110 can be configured to produce an indicator of the matching regions. In some embodiments, the blocks that are used for comparison between images can be collections of pixels associated with portions the images (e.g., images A1, A2). More details related to block-by-block comparisons are described in more detail in connection with the figures below.

The host device 100 and/or the client device 140 can be, for example, a wired device and/or a wireless device (e.g., wi-fi enabled device) and can be, for example, a computing entity (e.g., a personal computing device), a mobile phone, a personal digital assistant (PDA), a server device (e.g., a web server), and/or so forth. The host device 100 and/or the client device 140 can be configured to operate based on one or more platforms (e.g., one or more similar or different platforms) that can include one or more types of hardware, software, firmware, operating systems, runtime libraries, and/or so forth. In some implementations, the host device 100 and/or the client device 140 can represent a cluster of devices (e.g., a server farm). In such an implementation, the functionality and processing of the host device 100 and/or the client device 140 can be distributed to several devices of the cluster of devices. Although not shown in FIG. 1, the matching module 110 can be configured to function (e.g., operate) separately from the host device 100 and/or the client device 140 on another device (not shown).

Figure 2A:
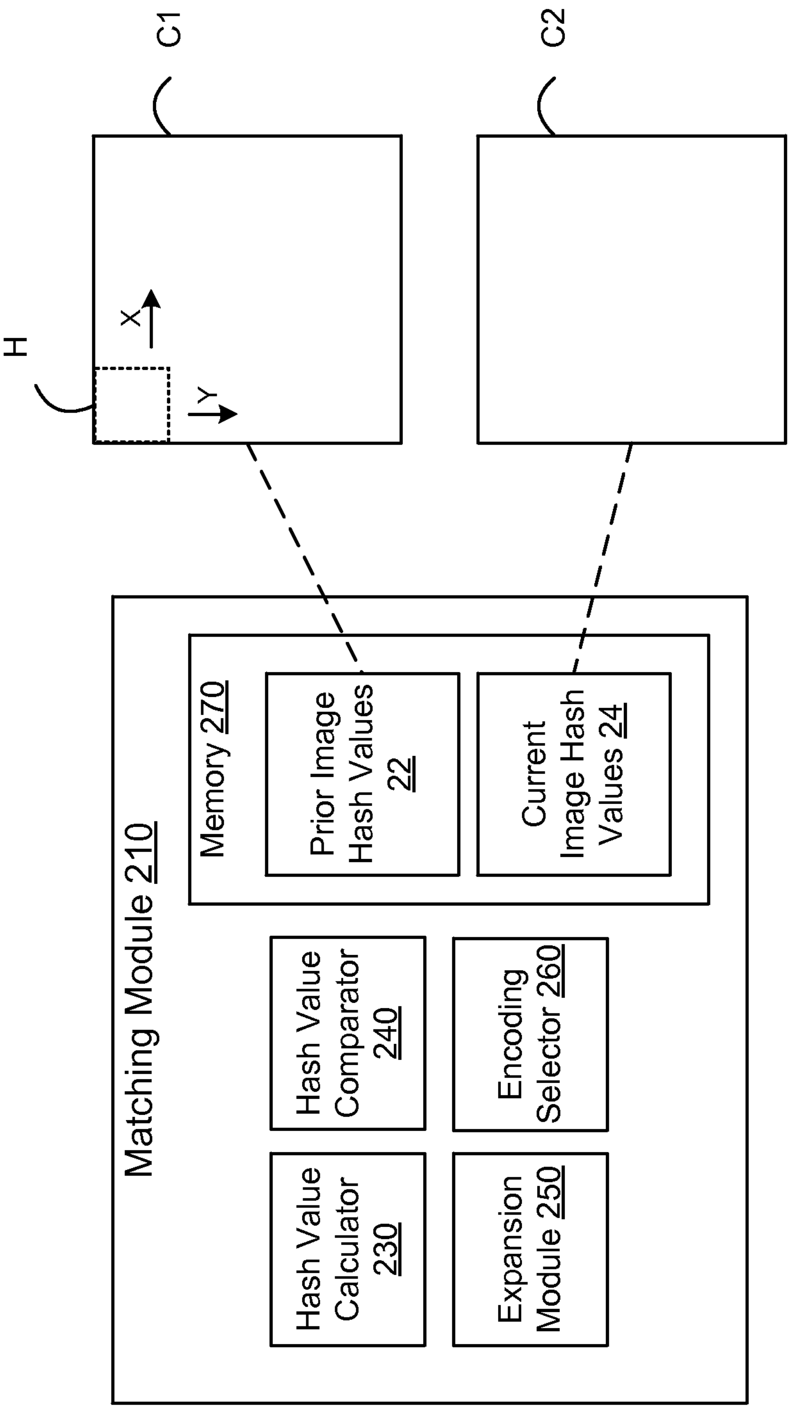
FIG. 2A is a block diagram that illustrates a matching module configured to compare images associated with an image stream based on hash values associated with blocks of pixels.

FIG. 2A is a block diagram that illustrates a matching module 210 configured to compare images associated with an image stream based on hash values associated with blocks of pixels. As shown in FIG. 2A, match module 210 includes a hash value calculator 230. The hash value calculator 230 is configured to calculate hash values for a prior image C1 and store the hash values of the prior image as prior image hash values 22. The prior image hash values 22 calculated by the hash value calculator 230 can each be based on a block H that has a size smaller than a size of the prior image C1. In some embodiments, the image stream can be associated with a remote desktop session between a client device (not shown) and a host device (not shown).

The hash values can be calculated for each combination of pixels that can be included in the area covered by block H (which can be referred to as a block window). For example, a hash value can be calculated for the set of pixel values included in the area covered by block H as shown in FIG. 2A. Hash values can be calculated for each set of pixel values within the prior image C1 by systematically shifting the area covered block H along direction X one column of pixels or systematically shifting block H along direction Y one row of pixels, and calculating a hash value with each shift. Accordingly, the hash values can be calculated by shifting the block H in a pattern (e.g., a scanning pattern) across the prior image C1. In some embodiments, the pattern can be referred to as a hash value calculation pattern.

In some embodiments, hash values can be calculated for less than all combinations of pixels that can be included in the area covered by block H. For example, an image can be divided into a grid of blocks and hash values can be calculated for each of the grid blocks. In some embodiments, hash values can be calculated for combinations of pixels that are offset by a specified amount (e.g., offset by a few pixels). In such embodiments, hash values can be calculated for less than all combinations of pixels that can be included in the area covered by block H, but hash values may be calculated for overlapping blocks.

In some embodiments, the hash value can be calculated using a rolling hash or additive hash procedure (e.g., algorithm). For example, a first hash value can be calculated based on pixel values associated with each pixel that is covered by block H when in a first position. When the block H is shifted to a second position (in the X direction or the Y direction), a second hash value can be calculated by subtracting pixel values associated with pixels that are no longer covered by the block H in the second position and adding pixel values associated with pixels that are covered by the shifted block H in the second position. In some embodiments, the hash value calculation procedure can be a version of Rabin-Karp's string matching procedure that has modified for multi-dimensional (e.g., two-dimensional, three-dimensional) calculations.

In some embodiments, the block H can be an 8×8 set of pixels, an 8×16 set of pixels, a 16×16 set of pixels, and so forth. In some embodiments, the block H can have a different shape than a square or rectangle. For example, the block H can be a 5-sided block. In some embodiments, the block H can have a size that is a fraction (e.g., 0.3 times, 0.1 times, 0.01 times) of a size of the images C1, C2. A more detailed example of hash value calculations associated with a block, such as block H, is described, for example, in connection with FIGS. 3A through 3C, and FIG. 4.

Figure 3A:
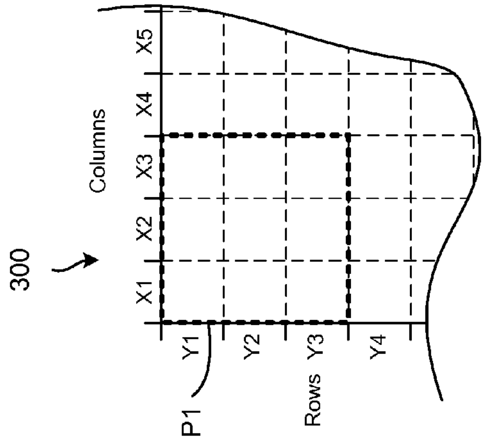
FIGS. 3A through 3C are diagrams that illustrate calculations of hash values of a portion of an image using a rolling hash procedure.
Figure 3B:
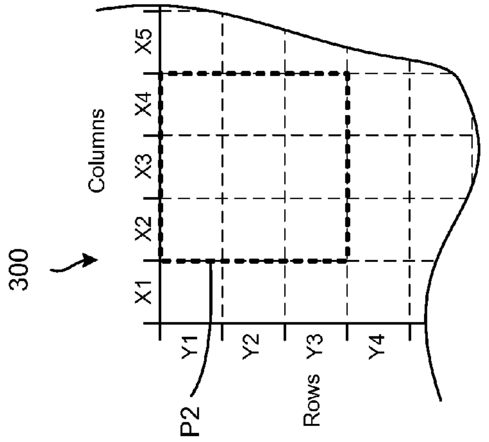
Figure 3C:
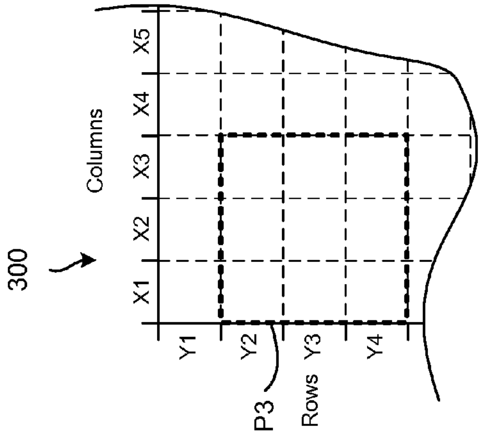

FIGS. 3A through 3C are diagrams that illustrate calculations of hash values of a portion of an image 300 using a rolling hash procedure. The pixels of the image 300 are represented by the grid (shown in dashed lines). Columns of pixels are labeled on the x-axis and rows of pixels are labeled on the y-axis. The hash values can be used for comparison of duplicate portions by, for example, the matching module 210 shown in FIG. 2A and/or the matching module 110 shown in FIG. 1.

FIG. 3A illustrates a block of pixels represented by block P1, and FIG. 3B illustrates a block of pixels represented by block P2, which is shifted to the right one column of pixels from the block P1. FIG. 3C illustrates a block of pixels represented by block P3, which is shifted down one row of pixels from the block P1. Each of the blocks P1 through P3 are a 3×3 matrix of pixels. For example, block P1 includes pixels (X1, Y1) through (X3, Y3).

A hash value Q is calculated for each of the blocks P1 through P3 (shown in FIGS. 3A through 3C) based on pixel values associated with each of the pixels included in the respective blocks. In some embodiments, the pixel values for each of the pixels can be, for example, a numeric value, or set of numeric values (e.g., red, green, and blue (RGB) color values), representing an aspect (e.g., a color, a chrominance) of the corresponding pixel. For example, the hash value Q(P1) can be calculated based on pixel values associated with each of the pixels included in the block P1. For example, the hash value Q(P1) can be calculated based on the following general formula:

$$Q(\text{Block})=[\text{Hash of First Column of Pixel Values}]*k+[\text{Hash of Second Column of Pixel Values}]*k^2+[\text{Hash of Third Column of Pixel Values}]*k^3.$$

The constant k can be, for example, a prime number, or another constant value. Substituting the pixel values for block P1 into the formula, where the pixel values are represented by the coordinates of each pixel, yields:

$$Q(P1)=[Q(\text{Column } X1,\text{Row } Y1{:}Y3)]*k+[Q(\text{Column } X2,\text{Row } Y1{:}Y3)]*k^2+[Q(\text{Column } X3,\text{Row } Y1{:}Y3)]*k^3$$

where $$Q(\text{Column } X1,\text{Row } Y1{:}Y3)=(X1,Y1)*k+(X1,Y2)*k^2+(X1,Y3)*k^3$$

$$Q(\text{Column } X2,\text{Row } Y1{:}Y3)=(X2,Y1)*k+(X2,Y2)*k^2+(X2,Y3)*k^3$$

$$Q(\text{Column } X3,\text{Row } Y1{:}Y3)=(X3,Y1)*k+(X3,Y2)*k^2+(X3,Y3)*k^3.$$

After the hash value Q(P1) for block P1 has been calculated, the hash values for block P2 (shown in FIG. 3B) and block P3 (shown in FIG. 3C) can be derived from the hash value Q(P1) calculated for block P1. For example, the mathematical manipulation to derive the hash value Q(P2) from the hash value Q(P1) can be handled using a variety of operations. Specifically, the hash value Q(P2) can be calculated by first dividing the hash value Q(P1) by the constant k, subtracting the hash of the first column of pixel values from block P1 (represented as Q(Column X1, Row Y1:Y3)), and then adding the hash of the third column of pixel values from the block P2 (represented as Q(Column X4, Row Y1:Y3)) multiplied by $k^3$. Only the hash of the third column of pixel values from block P2 need to be added to calculate the hash value Q(P2) because the first column and second column of pixel values from the block P2 correspond with the second column and third column of pixel values from the block P1, respectively. The formula for the hash value Q(P2) is shown below:

$$Q(P2)=[Q(\text{Column } X2,\text{Row } Y1{:}Y3)]*k+[Q(\text{Column } X3,\text{Row } Y1{:}Y3)]*k^2+[Q(\text{Column } X4,\text{Row } Y1{:}Y3)]*k^3$$

where $$Q(\text{Column } X4,\text{Row } Y1{:}Y3)=(X4,Y1)*k+(X4,Y2)*k^2+(X4,Y3)*k^3.$$

Similarly, the hash value Q(P3) for block P3 (shown in FIG. 3C) can be derived from the hash value Q(P1) calculated for block P1. Specifically, the pixel values associated with row Y1 of block P1 in the hash value for Q(P1) can be calculated based on a hash of the pixel values associated with rows Y2 through Y4 of block P3 to calculate the hash value Q(P3) for block P3. The mathematical manipulation to derive the hash value Q(P3) from the hash value Q(P1) can be handled using a variety of operations. For example, Q(Column X1, Row Y2:Y4) (shown below) can be derived from Q(Column X1, Row Y1:Y3) (shown above). The constants k, $k^2$, and $k^3$ multiplied (from left to right) by the pixel values of the row Y1 can be subtracted from hash value Q(P1) and the constants k, $k^2$, and $k^3$ multiplied (from left to right) by the pixel values of the row Y4 can be added to hash value Q(P1) to arrive at the hash value Q(P3). The formula for the hash value Q(P3) is shown below:

$$Q(P3)=[Q(\text{Column } X1,\text{Row } Y2{:}Y4)]*k+$$

$$[Q(\text{Column } X2,\text{Row } Y2{:}Y4)]*k^2+[Q(\text{Column } X3,\text{Row } Y2{:}Y4)]*k^3$$

where $$Q(\text{Column } X1,\text{Row } Y2{:}Y4)=(X1,Y2)*k+(X1,Y3)*k^2+(X1,Y4)*k^3$$

$$Q(\text{Column } X2,\text{Row } Y2{:}Y4)=(X2,Y2)*k+(X2,Y3)*k^2+(X2,Y4)*k^3$$

$$Q(\text{Column } X3,\text{Row } Y2{:}Y4)=(X3,Y2)*k+(X3,Y3)*k^2+(X3,Y4)*k^3.$$

Although not shown, a hash value Q(P4) for a block shifted to the right (one column of pixels) and down (one row of pixels) from block P1 can be similarly derived from the hash value Q(P2) for block P2 (shown in FIG. 3B) and the hash value Q(P3) for block P2 (shown in FIG. 3C). The formula for the hash value Q(P4) is shown below:

$$Q(P4)=[Q(\text{Column } X2,\text{Row } Y2{:}Y4)]*k+[Q(\text{Column } X3,\text{Row } Y2{:}Y4)]*k^2+[Q(\text{Column } X4,\text{Row } Y2{:}Y4)]*k^3$$

where $$Q(\text{Column } X2,\text{Row } Y2{:}Y4)=(X2,Y2)*k+(X2,Y3)*k^2+(X2,Y4)*k^3$$

$$Q(\text{Column } X3,\text{Row } Y2{:}Y4)=(X3,Y2)*k+(X3,Y3)*k^2+(X3,Y4)*k^3$$

$$Q(\text{Column } X4,\text{Row } Y2{:}Y4)=(X4,Y2)*k+(X4,Y3)*k^2+(X4,Y4)*k^3.$$

By deriving hash values from other hash values, the calculations of the hash values can be simplified, and performed at a relatively rapid rate. Additional rows and/or columns can be added to and/or subtracted from a previously calculated hash value to calculate a new hash value for a block without manipulating (e.g., adding, using) all of the pixel values for each of the pixels included within the block. This can be a particular advantage for relatively large blocks that can include hundreds of pixels. In some embodiments, hash values can be calculated for blocks of pixels without deriving the hash values from other previously calculated hash values. For example, hash value Q(P3) can be calculated based on pixel values (e.g., a block of pixel values) without deriving the hash value Q(P3) from hash value Q(P1).

In some embodiments, hash values can be calculated for blocks that are shifted from one another by one or more rows of pixels and/or one or more columns of pixels. For example, although not shown, in some embodiments, the block P2 can be shifted more than one column of pixels from the block P1. In such embodiments, the block P2, even though it is shifted more than one column pixels from block P1, can be used to calculate a hash value based on a hash value for block P1. As another example, although not shown, in some embodiments, the block P2 can be shifted by one column of pixels and by one row of pixels from the block P1. In such embodiments, the block P2, even though it is shifted by one column pixels and by one row of pixels from block P1, can be used to calculate a hash value based on a hash value for block P1.

Figure 4:
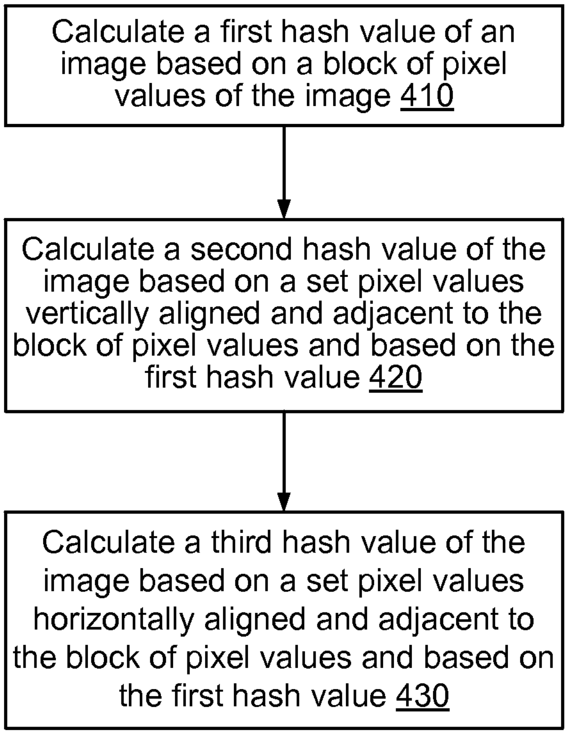
FIG. 4 is a flowchart that illustrates a method for calculating hash values using a rolling hash procedure.

FIG. 4 is a flowchart that illustrates a method for calculating hash values using a rolling hash procedure. As shown in FIG. 4, a first hash value of an image is calculated based on a block of pixel values of the image (block 410), and a second hash value of the image is calculated based on a set pixel values vertically aligned and adjacent to the block of pixel values and based on the first hash value (block 420). In some embodiments, the set of pixel values vertically aligned (which can define a column) can be shifted one column of pixels from the block pixel values. In some embodiments, at least a portion of the first hash value can be subtracted from the first hash value to calculate second hash value.

A third hash value of the image based on a set pixel values horizontally aligned and adjacent to the block of pixel values and based on the first hash value (block 430). In some embodiments, the set of pixel values horizontally aligned (which can define a row) can be shifted one row of pixels from the block pixel values. Thus, the set of pixel values that are horizontally aligned can be orthogonal to the set of pixel values that are vertically aligned. The set of pixel values that are horizontally aligned may not overlap with the set of pixel values that are vertically aligned. In some embodiments, a portion of the first hash value used to calculate the second hash value can be different than a portion of the first hash value used to calculate the third hash value. In some embodiments, the first hash value, the second hash value, and/or the third hash value can be calculated using the hash value calculator 230 shown in FIG. 2A.

Referring back to FIG. 2A, the hash value calculator 230 can also be configured to calculate hash values for a current image C2 and store the hash values of the current image as current image hash values 24. The hash values for the current image C2 can also be based on the block H. Specifically, hash values can be calculated for each combination of pixels for current image C2 that can be included in the area covered by block H using a rolling hash procedure (such as that described above) and/or another type of hash calculation procedure. In some embodiments, hash values for the current image C2 can be calculated using the same hash value calculation procedure and/or scan pattern that is used to calculate the hash values for the prior image C1.

As shown in FIG. 2A, the matching module 210 includes a hash value comparator 240. The hash value comparator 240 is configured to compare the prior image hash values 22 with the current image hash values 24 to determine (e.g., identify) whether or not portions of the prior image C1 are duplicated within the current image C2. For example, a hash value from the prior image hash values 22 that matches with the hash value from the current image hash values 24, as determined by (and indicated by) the hash value comparator 240, can be an indicator that a set of pixels used to calculate the hash value from the prior image hash values 22 is identical to a set of pixels used to calculate the hash value from the current image hash values 24.

In some embodiments, each hash value from the current image hash values 24 can be compared with each hash value from the prior image hash values 22 to identify matches (e.g., duplications). In some embodiments, once a match has been identified between a hash value from the current image hash values 24 and a hash value from the prior image hash values 22, further comparison of the hash value from the current image hash values 24 with the remaining hash values from the prior image hash values 22 can be terminated. In some embodiments, further comparisons can be performed by comparing pixel values between blocks of pixel values (between a current image and a prior image).

In some embodiments, matches (e.g., duplicates) between the prior image hash values 22 and the current image hash values 24 can be identified (e.g., identified dynamically) as the current image hash values 24 are being calculated. For example, the prior image hash values 22 for each combination of pixels for the prior image C1 that can be included in the area covered by block H (e.g., block window H) can be stored in the memory 270. As hash values are being calculated for the current image C2 using, for example, a rolling hash procedure, the hash values for the current image C2 can be compared with each of the prior image hash values 22 (until a match is identified (e.g., found)) and the hash values for the current image C2 can be stored as current image hash values 24.

Figure 2B:
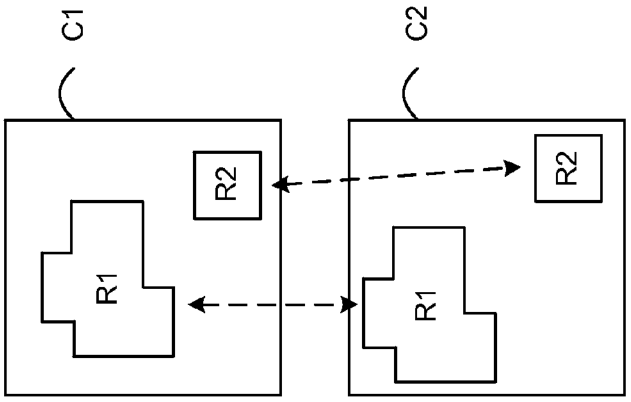
FIG. 2B illustrates two different regions that are duplicated within images.

In some embodiments, multiple hash values from the prior image hash values 22 can match with hash values from the current image hash values 24. For example, FIG. 2B illustrates two different regions, region R1 and region R2, that are duplicated between the prior image C1 and the current image C2. Region R2 is a square region identified based on a match of a single hash value calculated for the prior image C1 and a single hash value calculated for the current image C2. Region R1, in contrast, is a non-square region related to multiple matching hash values between blocks of prior image C1 and blocks of the current image C2.

Referring back to FIG. 2A, block sizes that are used to calculate hash values can vary. In some embodiments, block sizes used calculate hash values can be between two times larger than a single pixel size and many times larger than a single pixel size (e.g., 5 times larger, 10 times larger, 100 times larger). In some embodiments, the use of a relatively large block size can result in a relatively small number of matches between blocks in a prior image and blocks in a current image than if using a smaller block size. However, the use of a relatively small block size can require significant computing resources and/or time to calculate and/or perform comparisons between relatively large numbers of hash values related to the relatively small block sizes.

After comparisons between the prior image hash values 22 and the current image hash values 24 are completed by the hash value comparator 240, the current image hash values 24 can replace the prior image hash values 22. Accordingly, the current image hash values 24 can be considered prior image hash values that can be compared with subsequent hash values calculated for an image subsequent to image C2 (in a pipelined fashion). The current image C2 can be considered a prior image and the image subsequent to image C2 can be considered a current image.

Although not shown in FIG. 2A, in some embodiments, the current image hash values 24 can be compared with hash values associated with more than one prior image and/or non-consecutive prior images. Accordingly, image hash values for blocks associated with images that are not consecutive (e.g., not adjacent in time) within an image stream can be compared. For example, the current image hash values 24 associated with image C2 can be compared with the prior image hash values 22 associated with a prior image C1 and/or with hash values (not shown) associated with an image prior to prior image C1. In such embodiments, movement data associated with a region duplicated within non-adjacent images can refer to movement of the duplicated region between the non-adjacent images.

As shown in FIG. 2A, the matching module 210 includes an encoding selector 260. The encoding selector 260 can be configured to designate non-duplicated (e.g., non-matching) regions for encoding based on one or more encoding procedures (e.g., encoding algorithms). For example, a region in a current image that is not duplicated in a prior image can be designated for encoding. The encoding can be, or can include, for example, lossy encoding (e.g., a discrete cosine transform (DCT) based encoding technique), lossless and encoding, variable-length encoding, entropy encoding, and/or so forth. Duplicated regions between a prior image and a current image will not be designated for encoding, but the duplicated region within the current image will instead be characterized with respect to the prior image based on movement data.

Figure 5:
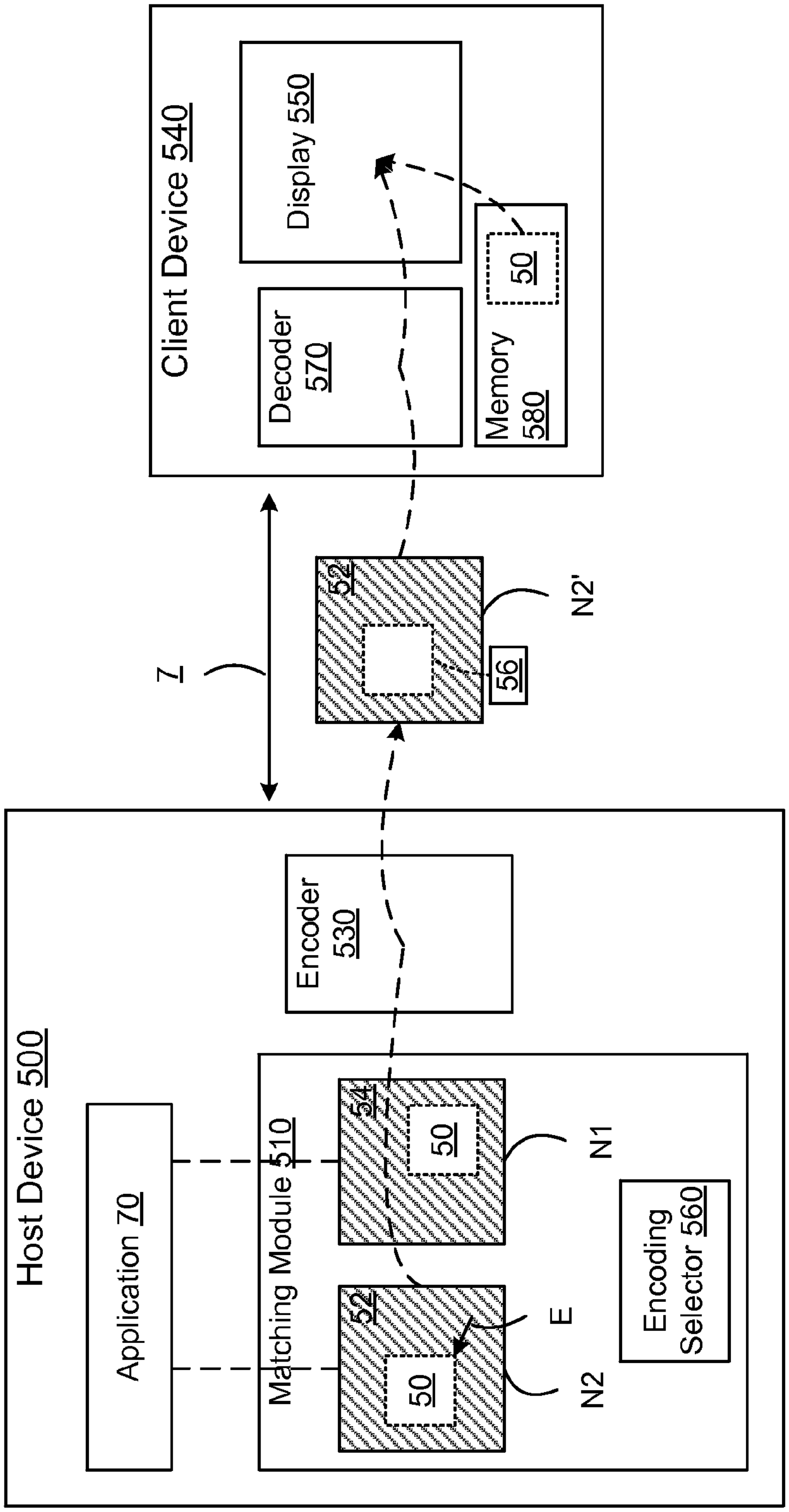
FIG. 5 is a diagram that illustrates a region that is duplicated within images at a matching module, according to an embodiment.

In some embodiments, the encoding selector 260 can be configured to change a designation associated with a region. For example, a region in a current image that is not duplicated in a prior image can be initially designated for encoding. If a portion of the region (based on another block comparison) from the current image is later identified as matching another region of the prior image, the designation of the portion of the region can be changed. Specifically, the portion of the region can be designated for duplication, and the remaining portions (if any) of the region can be designated for encoding. FIG. 5 is a block diagram that illustrates a region of an image that is designated for encoding.

FIG. 5 is a diagram that illustrates a region 50 that is duplicated within images at a matching module 510, according to an embodiment. Specifically, the region 50 from image N1, which is a prior image, is duplicated within image N2, which is a current image. The region 50 is shifted from a location included in the prior image N1 to a location in the current image N2 by an offset represented by vector E.

The region 50 that is duplicated from the prior image N1 in the current image N2 is identified using a matching module 510. The images N1, N2 are associated with an application 70 operating at a host device 500, and are being streamed within a stream of images via a communication link 7 to a client device 540 for display on a display 550 of the client device 540.

When images are sent from the host device to the client device 540 via the communication link 7 (which can be associated with a remote desktop session) as a stream of images, portions of the images that are not duplicated within one another are encoded by an encoder 530. The non-duplicated regions can be designated for encoding by an encoding selector 560, and the encoding can be, or can include, for example, lossy encoding (e.g., a discrete cosine transform (DCT) based encoding technique), lossless encoding, variable-length encoding, entropy encoding, and/or so forth.

The encoded portions of the images can be decoded at a decoder 570 (e.g., decoded using the reverse of the encoding applied at the encoder 530) of the client device 540 so that the decoded portions of the images can be displayed on the display 550 of the client device 540. One or more regions of the images (e.g., region 50) that are duplicated within one another, rather than being encoded, can be identified as having moved within images by a vector (or as remaining in the same position within images). In some embodiments, the movement of the duplicated region(s) between images can be characterized by movement data (e.g., metadata) that includes, for example, an offset value representing a vector (e.g., a magnitude and a direction) of the movement, a size of a region (such as region 50) that has moved, an original and/or target location of a block that has moved, and/or so forth. Data associated with a portion of an image that has been encoded (also can be referred to as encode image data) can consume significantly more bandwidth than movement data associated with the portion of the image.

Specifically, as shown in FIG. 5, the image N2 has portions 52 encoded by the encoder 530 as encoded image N2' and the encoded image N2' is sent to the client device 540. Because the region 50 included in the image N2 is duplicated (but offset) from the image N1, only the portions 52 outside of the region 50 in the image N2 are encoded by the encoder 530 into image N2' before the image N2' (or portion thereof) is sent to the client device 540. The encoded image N2' is represented within FIG. 5 as being in transit from the host device 500 to the client device 540 via the communication link 7. Rather than being encoded and sent via the communication link 7, the region 50 can be identified as a portion that has shifted within the image N2 from the prior image N1 by an offset (represented by vector B). Movement data 56 (e.g., movement metadata), which is associated with the encoded image N2', characterizes the movement of the region 50 from the image N1. A copy of the region 50, which can be stored (e.g., cached, temporarily stored) within a memory 580 of the client device 540 can be inserted, based on the movement data 56, for display within a decoded version (not shown) of the encoded image N2'. The movement data 56 can function as an instruction configured to trigger accessing of the region 50 for insertion. The combining of the decoded version of the encoded image N2' and the region 50 stored in the memory

580 is depicted by the dashed arrows that meet at display 550. The region 50, which is stored (e.g., buffered) within the memory 580 and/or can be an encoded version of region 50, can be from a prior image (e.g., image N1 or an earlier image) displayed at the display 550 of the client device 540.

Because only portions of each of the images from the stream of images outside of the duplicated regions are encoded, the identification of duplicated regions by the matching module 510 can result in a reduction in the portions of the stream of images that are encoded by the encoder 530 and sent via the communication link 7 as encoded portions. As a specific example, a word processing application (i.e., application 50) can be operating at the host device 500 and controlled at the host device 500 using the client device 540. A user interface (which can correspond with region 50) associated with the word processing application can be moved (e.g., dragged), without being modified, using a mouse device (not shown) of the client device 540. A stream of images (or images) of the movement of the user interface can be produced at the host device 500 using the word processing application and sent to the client device 540 for display on the display 550. Because the user interface is simply being moved (and is not modified), the representation of the user interface will be identical (e.g., duplicated) within each image of the stream of images except for x-y position of the user interface within each image. Rather than entirely encoding each of the images separately (including the duplicated images of the user interface) and sending the encoded versions of each of the images associated with the image stream via the communication link 7, the matching module 510 can be configured to identify the duplicated user interface within each of the images and only the portions of the images around the user interface (e.g., background portions around the user interface) will be encoded. The matching module 510 can characterize (e.g., characterize using movement data) the movement (e.g., x-y position) of the user interface within the each of the images of the stream of images, and the user interface portion within each of the images will not be separately encoded. Instead, an image (e.g., an encoded image) of the user interface can be sent to the client device 540 once and used multiple times, adjusted for movement (e.g., x-y position, offset location) based on the movement data, within each of the portions of the images as they are decoded and displayed.

In some embodiments, the region 50 stored in the memory 580 can be an encoded version of the region 50. In such embodiments, the region 50 can be decoded before being displayed with the encoded image N2' or after being decoded for display within the display 550 by the decoder 570. Also, in such embodiments, the region 50, if encoded, can be combined with the encoded image N2' and the combination of the encoded region 50 and the encoded image N2' can be decoded together by the decoder 570 before being displayed within the display 550.

Referring back to FIG. 2A, the matching module 210 includes an expansion module 250. After a region within the current image C2 is identified as a duplicate of a region within the prior image C1 by the matching module 210 based on, for example, respective hash values of blocks, the matching regions can be expanded using the expansion module 250. Specifically, pixels (or another subset of the images) around the matching region within the current image C2 and the prior image C1 can be compared, based on pixel values associated with pixels, to determine if the matching region can be expanded (without calculating additional hash values). A more specific example of a comparison of hash values of blocks and expansion of a matching region is described in connection with FIGS. 6A through 6H.

The matching module 210 can be, or can include, various types of hardware and/or software. In some implementations, one or more portions of the components shown in the matching module 210 in FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the matching module 210 can be, or can include, a software module configured for execution by at least one processor (not shown). In some implementations, the functionality of the components can be included in different modules and/or components than those shown in FIG. 2A. For example, although not shown, the functionality of the hash value calculator 230 of the matching module 210 can be included in a different module than the hash value calculator 230 of the matching module 210, or divided into several different modules.

Although not shown, in some implementations the matching module 210 (or portions thereof) can be configured to operate within, for example, a data center (e.g., a cloud computing environment), a computer system, one or more server/host devices, and/or so forth. In some implementations, the matching module 210 (or portions thereof) can be configured to operate within a network. Thus, the matching module 210 (or portions thereof) can be configured to function within various types of network environments that can include one or more client devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

Although not shown, in some implementations, the memory 270 can be implemented as more than one memory component (e.g., more than one random-access memory (RAM) component or disk drive memory). In some implementations, the memory 270 can be a database memory. In some implementations, the memory 270 can be, or can include, a non-local memory. For example, the memory 270 can be, or can include, a memory shared by multiple devices (not shown). In some implementations, the memory 270 can be associated with a server device (not shown) within a network and configured to serve the matching module 210.

Figure 6B:
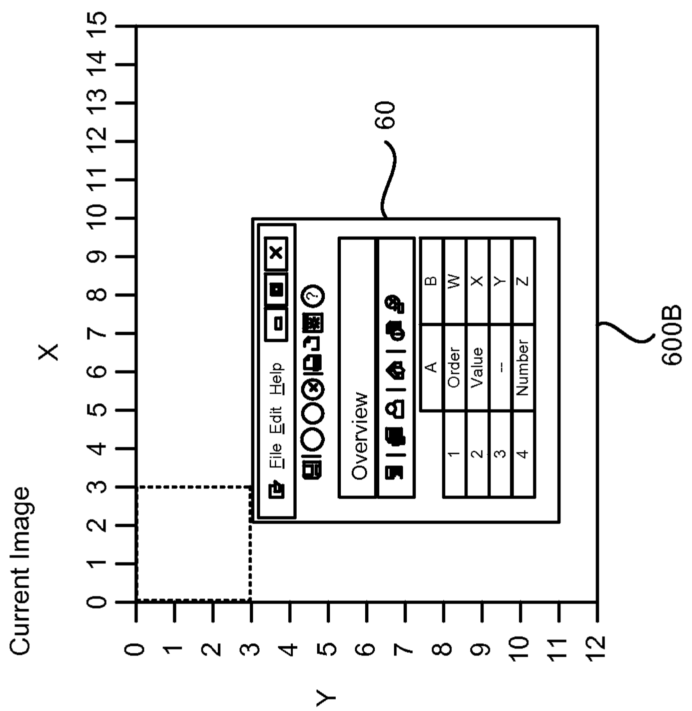
FIGS. 6B through 6F are diagrams that illustrate the user interface from the prior image duplicated in a current image.
Figure 6A:
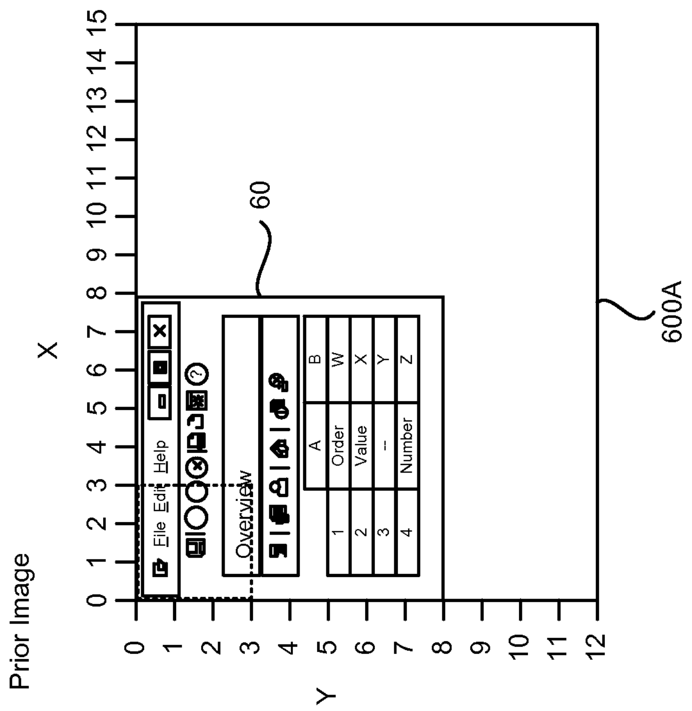
FIG. 6A is a diagram that illustrates a user interface of a prior image.

FIG. 6A is a diagram that illustrates a user interface 60 of a prior image 600A. In some embodiments, the user interface 60 can be a portion of a user interface associated with an application operating at a host device (not shown). The prior image 600A, and the user interface 60 included therein, can be communicated to a client device (not shown) for display on a display of the client device during, for example, a remote desktop session. The prior image 600A is divided into a grid with X-coordinates and Y-coordinates, and the user interface 60 has an upper-left corner at coordinates (0,0).

Hash values for blocks of the prior image 600A are calculated using, for example, a matching module such as matching module 110 shown in FIG. 1. In this embodiment, the hash values for blocks of the prior image 600A are calculated starting with a block having an upper-left corner at coordinates (0,0) (as shown in FIG. 6A). Subsequent hash values are calculated by shifting the block, for each row of Y values (starting with the smallest Y values), from the left to right with increasing X coordinate values. In this embodiment, the coordinates of the blocks do not correspond with pixels, but in other embodiments, the coordinates of the blocks can correspond with pixels.

In this embodiment, the hash values are calculated for 3×3 blocks. Some of the hash values calculated for the prior image 600A are illustrated in a table (e.g., a prior hash value table) shown in FIG. 6G. For example, hash value of "H5T2" is calculated for a block at coordinates (0,1), and a hash value of "AQ70" is calculated for a block at coordinates (9,10).

In this embodiment, the hash values for the prior image 600A are each calculated by shifting a 3×3 block, for each row of Y values (starting with the smallest Y values), from the left to right with increasing X coordinate values. In some embodiments, the hash values for the prior image 600A can be calculated in a different order (e.g., different pattern) than that described in connection with FIG. 6A. For example, hash values can be calculated based on block (e.g., a block window) moving in a zigzag pattern, based on block movement starting with the bottom left corner of the prior image 600A, based on block movement starting with the bottom right corner of the prior image 600A, and/or so forth. As another example, in some embodiments, hash values can be calculated by moving the block vertically (instead of horizontally) (e.g., vertically based on information that movement of portions of a user interface are vertical in response to scrolling of a mouse device). Specifically, the hash values for a prior image can be each calculated by shifting a block, for each column of X values (starting with the smallest X values), from the top to bottom with increasing Y coordinate values.

In some embodiments, the prior image 600A (which can include encoded portions and/or movement data related to duplicated regions) may be sent to, for example, a client device during a remote desktop session before, or while, analysis of blocks (for duplicates) of the current image 600B begins. In some embodiments, the prior image 600A (which can include encoded portions and/or movement data related to duplicated regions) may be sent to, for example, a client device during a remote desktop session after analysis of blocks (for duplicates) of the current image 600B is completed.

FIGS. 6B through 6F are diagrams that illustrate the user interface 60 shown in the prior image 600A shown in FIG. 6A duplicated within a current image 600B. as shown in FIGS. 6B through 6F, the user interface 60 is moved from a position where the upper-left corner of the user interface 60 is at coordinates (0,0) to a position where the upper-left corner of user interface 60 is at coordinates (2,3).

Figure 6C:
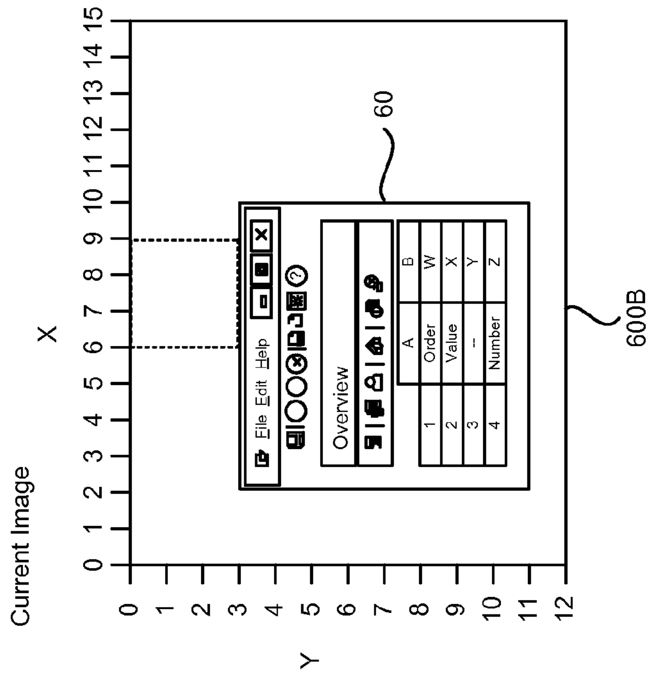
Figure 6D:
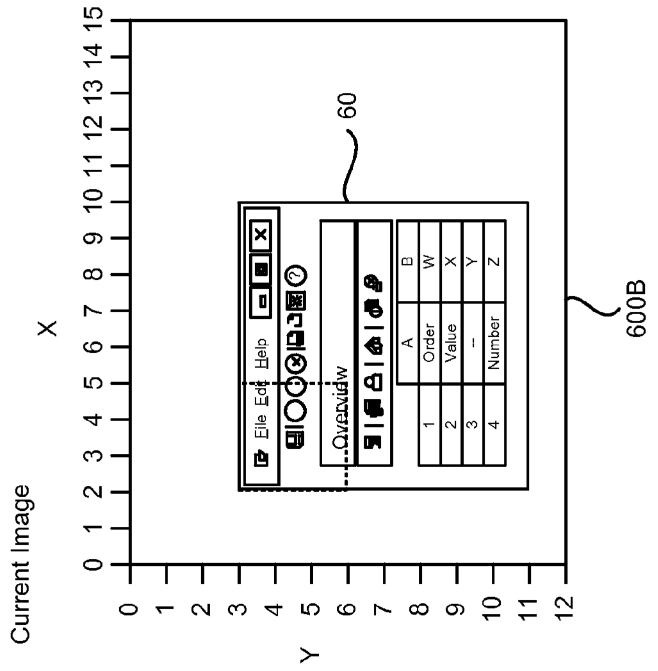

In this embodiment, hash values for blocks of the current image 600B are calculated starting with a block having an upper-left corner at coordinates (0,0) (as shown in FIG. 6B). Subsequent hash values are calculated by shifting the block, for each row of Y values (starting with the smallest Y values), from the left to right with increasing X coordinate values. FIGS. 6C and 6D are diagrams that illustrate blocks, for which hash values can be calculated, at coordinates (6,0) and (2,3), respectively. Hash values calculated for the current image 600B based on blocks within the current image 600B are shown in FIG. 6H (in a current hash value table).

Because the user interface 60 has moved, the hash value for the block at coordinates (0,0) for the current image 600B is different than the hash value for the prior image 600A at coordinates (0,0). Specifically, the hash value for the block at coordinates (0,0) is "O47W" for the current image 600B, which is different than the hash value of "Q41B" at coordinates (0,0) for the prior image 600A shown in FIG. 6G. Accordingly, a matching module (e.g., matching module 110 shown in FIG. 1) configured to compare hash values can identify the block at coordinates (0,0) in the current image 600B as being different from the block at coordinates (0,0) for the prior image 600A based on the differing hash values.

Because the user interface 60 has moved to the coordinates (2,3), the hash value for the block at coordinates (2,3) for the current image 600B (shown in FIG. 6D) is identical to the hash value for the prior image 600A at coordinates (0,0) (shown in FIG. 6A). Specifically, the hash value for the block at coordinates (0,0) is "Q41B" for the current image 600B (shown in FIG. 6H), which is the same (as illustrated by dashed arrow) as the hash value of "Q41B" at coordinates (0,0) for the prior image 600A (shown in FIG. 6G). Accordingly, a matching module (e.g., matching module 110 shown in FIG. 1) configured to compare hash values can identify the block at coordinates (2,3) in the current image 600B as being identical to the block at coordinates (0,0) for the prior image 600A based on the same hash values. In some embodiments, the block can be referred to as a matching block. In some embodiments, an offset of the position of the user interface 60 within the current image 600B from the position of the user interface 60 within the prior image 600A can be calculated based on the coordinates.

As shown in FIGS. 6G and 6H, additional hash values associated with blocks from the prior image 600A and the current image 600B, respectively, are shown as matching. For example, the hash value of "H5T2" at coordinates (2,4) for the current image 600B (shown in FIG. 6H), which is shifted one coordinate to the right from coordinates (2,3), is the same as the hash value of "H5T2" at coordinates (0,1) for the prior image 600A (shown in FIG. 6G).

Various procedures can be implemented to identify all of the matching portions of the user interface 60 between the prior image 600A and the current image 600B after a matching block has been identified. For example, in some embodiments, additional hash values for blocks within the user interface 60 for the prior image 600A and current image 600B can be calculated and compared. In such embodiments, the blocks may be overlapping blocks (e.g., may be at overlapping coordinates). In some embodiments, the matching block within the prior image 600A and the current image 600B can be expanded by comparing portions of the current image 600B around the matching block with portions of the prior image 600A. In such embodiments, hash values may not be calculated and/or compared while expanding the matching block. Instead, portions of the images, such as individual pixel values (or relatively small groups of pixel values (e.g., rows of pixel values, columns of pixel values)), can be compared to identify (e.g., and to determine) whether additional portions around the matching block are identical (e.g., match).

Figure 6F:
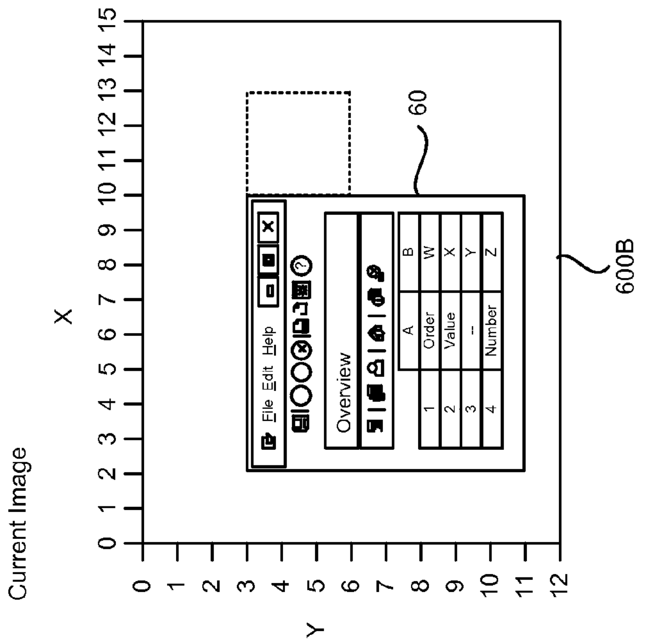
Figure 6E:
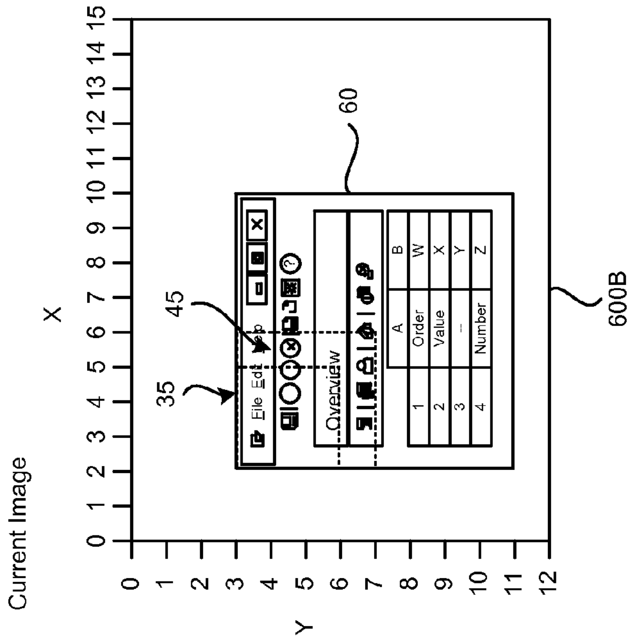

As shown in FIG. 6E, the region 45 (or portions thereof) around the matching block 30 of the user interface 60 are compared with corresponding portions around the block shown in FIG. 6A. In some embodiments, additional regions (or portions thereof) around the matching block 30 of the user interface 60 shown in FIG. 6E can be compared with corresponding portions around the block shown in FIG. 6A (without calculating additional hash values) until the entire user interface 60 shown in FIG. 6E is identified as matching with (e.g., being a duplicate of) the user interface 60 shown in FIG. 6A. In other words, the matching block 30 of the user interface 60 is expanded using a pixel-by-pixel comparison rather than a hash value comparison. In some embodiments, the matching block 30 can be expanded (e.g., expanding using comparisons of pixel values) by an expansion module such as expansion module 250 shown in FIG. 2A.

In some embodiments, boundaries (e.g., edges) of a matching region (when expanding from a matching block) can be identified when portions of the current image 600B no longer match with portions of the prior image 600A. In some embodiments, a region that is identified as a matching region expanded from a matching block may not be a square or rectangle. In other words, the matching region expanded from a matching block may not be a four-sided polygon (e.g., a number of sides of the matching region can increase beyond four). For example, only a few pixels outside of a matching block of current image 600B may be identified as matching within (e.g., as being identical with) the prior image 600A. In such embodiments, the matching region expanded from the block may not be square (or rectangular).

Calculation of hash values is resumed starting with the block shown in FIG. 6F (with an upper-left corner at coordinates (10,3)) after the user interface 60 of the current image 600B shown in FIG. 6E is identified as matching the user interface 60 of the prior image 600A shown in FIG. 6A. After the matching region has been identified (whether the matching region is a single block or an expanded block), hash values may be calculated only for portions outside of the matching region. The coordinates (10,3) represent the next position within the current image 600B (outside of the user interface 60, which has been identified as a matching region) that should be calculated based on the hash value calculation pattern used within this example.

In some embodiments, calculation of hash values can be resumed starting at a different place than that shown in FIG. 6F. In some embodiments, resumption of hash value calculations based on blocks can depend on the pattern used to calculate hash values. For example, hash values can be calculated for each of the columns from top to bottom starting in the first column (on the left of the current image 600B). In such embodiments, after the user interface 60 is identified as a matching region hash value calculations can be resumed starting at, for example, coordinates (2,0). In some embodiments, a pattern used to calculate hash values for the current image 600B can be different than the pattern used to calculate hash values from the prior image 600A.

In some embodiments, only portions of an image (e.g., current image 600B) that are identified as potentially changing are analyzed based on the methods described herein by a matching module (e.g., matching module 110 shown in FIG. 1). For example, only a portion of a current image can be initially identified for the matching module as having changed. The portions of the current image can be analyzed based on the methods described herein for duplicate regions by the matching module.

Figure 7:
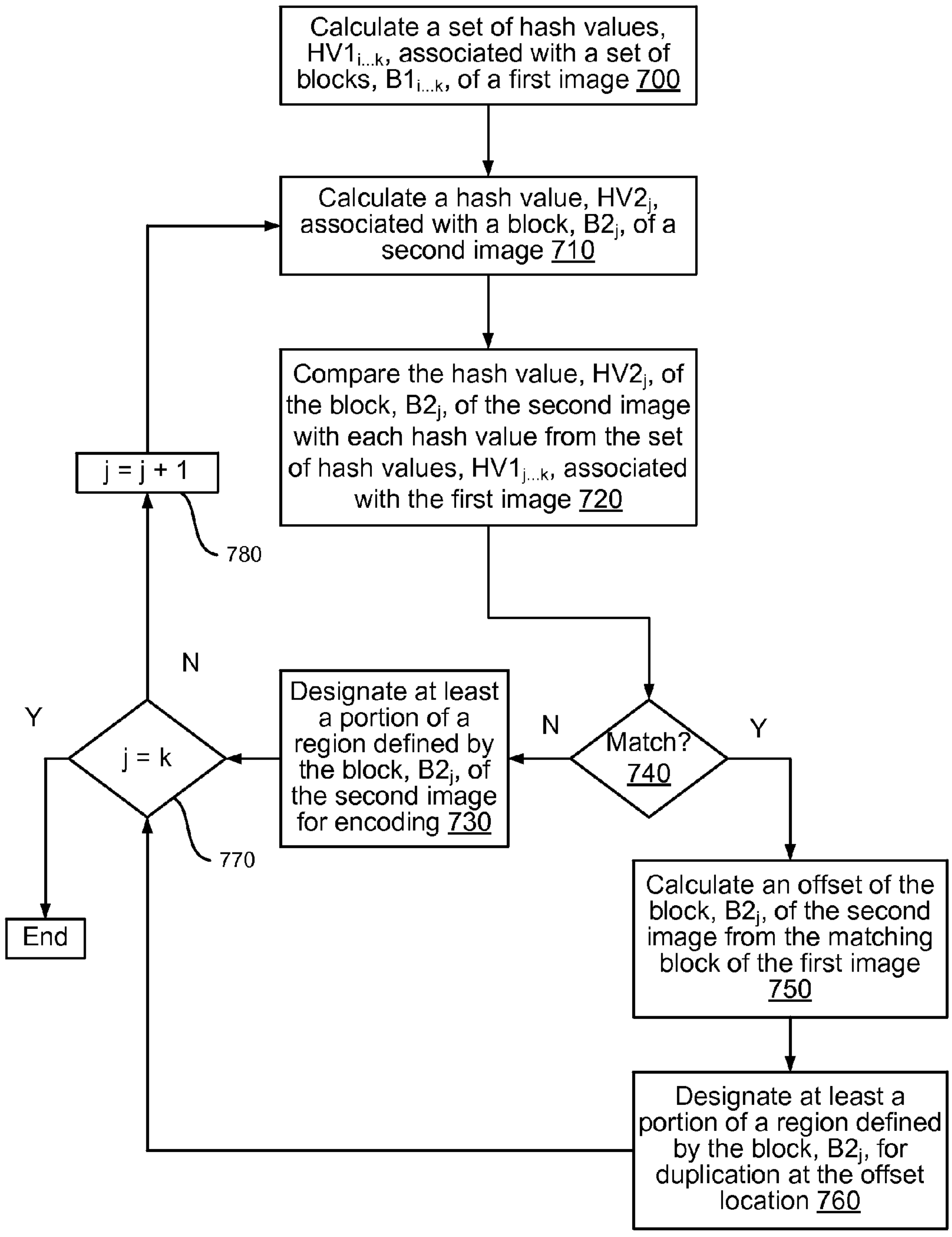
FIG. 7 is a flowchart that illustrates a method for identifying matching regions between a first image and a second image.

FIG. 7 is a flowchart that illustrates a method for identifying matching regions between a first image and a second image. In some embodiments, first image can be a prior image and the second image can be a current image. In some embodiments, at least some portions of the method shown in FIG. 7 can be performed by, for example, a matching module (e.g., matching module 110 shown in FIG. 1).

A set of hash values, $HV_{1, \ldots, k}$, associated with a set of blocks, $B1_{i \ldots k}$, of a first image can be calculated (block 700). The set of hash values, $HV1_{i, \ldots, k}$, can be calculated by the hash value calculator 230 shown in FIG. 2A. The hash values can be calculated using, for example, the methods described, for example, in connection with FIGS. 3A through 3C. In some embodiments, the hash values can be calculated based on pixel values associated with pixels of, for example, a bitmap image, a compressed image, and/or so forth.

A hash value, $HV2_j$, associated with a block, $B2_j$, of a second image is calculated (block 710). The hash values, $HV2_j$, can be calculated by the hash value calculator 230 shown in FIG. 2A. The hash values can be calculated using, for example, the methods described, for example, in connection with FIGS. 3A through 3C. In some embodiments, the hash values can be calculated based on pixel values associated with pixels of, for example, a bitmap image, a compressed image, and/or so forth. The pattern used to calculate the hash values associated with the first image can be different than the pattern used to calculate the hash values associated with the second image.

The hash value, $HV2_j$, of the block, $B2_j$, of the second image is compared with each hash value from the set of hash values, $HV1_{j \ldots k}$, associated with the first image (block 720). The hash value, $HV2_j$, of the block, $B2_j$, of the second image can be compared with each hash value from the set of hash values, $HV1_{j \ldots k}$, associated with the first image using the hash value comparator 240 shown in FIG. 2A.

As shown in FIG. 7, if the hash value $HV2_j$ of the block $B2_j$ of the second image is not matched (block 740) with at least one hash value from the set of hash values $HV1_{i \ldots k}$ associated with the set of blocks $B1_{i \ldots k}$ of the first image, at least a portion of a region defined by the block $B2_j$ of the second frame is designated for encoding (block 730). This determination can be performed by the hash value comparator 240 shown in FIG. 2A, and the block can be designated for encoding by the encoding selector 260 shown in FIG. 2A.

If the block $B2_j$ is the last block when j=k (block 770), then the procedure is completed. If the block $B2_j$ is not the last block and j≠k (block 770), then the index j is incremented by j=j+1 (block 780). The procedure is repeated starting at block 710.

As shown in FIG. 7, if the hash value $HV2_j$ of the block $B2_j$ of the second image is matched (block 740) with at least one hash value from the set of hash values $HV1_{i \ldots k}$ associated with the set of blocks $B1_{i \ldots k}$ of the first image, an offset of the block, $B2_j$, of the second frame from the matching block of the first frame is calculated (block 750). In some embodiments, the offset can be calculated after all, or a portion of the duplicated blocks, have been identified. In some embodiments, the offset can be calculated using an offset calculator (not shown), which can be included in a matching module. In some embodiments, metadata characterizing the offset can be sent from a host device to a client device during a remote desktop session.

At least a portion of a region defined by the block $B2_j$ is designated for duplication at the offset location (block 760) after the offset is calculated (block 750). The block can be designated for duplication by the encoding selector 260 shown in FIG. 2A. In some embodiments, the blocks (which can be combined to define a region that is larger than a single block) can be designated for encoding and/or duplication after all, or a portion of the blocks, have been processed.

After at least a portion of a region defined by the block $B2_j$ is designated for duplication at the offset location (block 760) and the block $B2_j$ is the last block when j=k (block 770), then the procedure is completed. If the block $B2_j$ is not the last block and j≠k (block 770), then the index j is incremented by j=j+1 (block 780), and the procedure is repeated starting at block 710.

Figure 8:
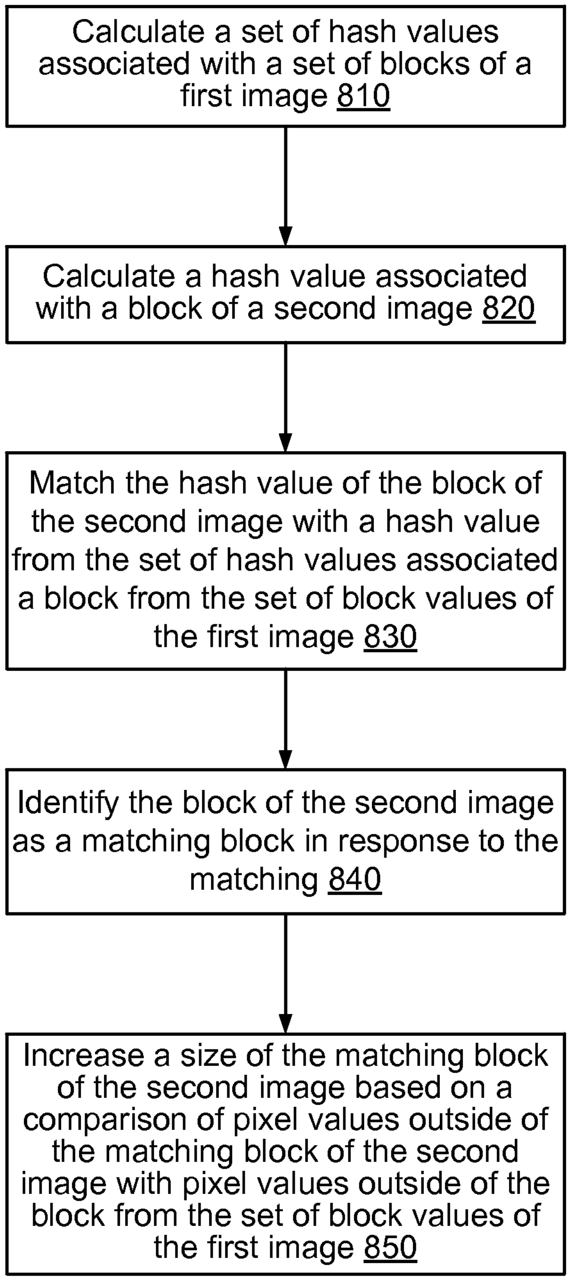
FIG. 8 is a flowchart that illustrates a method for expanding a matching block.

FIG. 8 is a flowchart that illustrates a method for expanding a matching block. In some embodiments, at least some portions of the method shown in FIG. 8 can be performed by, for example, an expansion module (e.g., expansion module 250 of matching module 210 shown in FIG. 2A).

A set of hash values associated with a set of blocks of a first image is calculated (block 810). The set of hash values can be calculated by the hash value calculator 230 shown in FIG. 2A. The hash values can be calculated using, for example, the methods described, for example, in connection with FIGS. 3A through 3C. In some embodiments, the hash values can be calculated based on pixel values associated with pixels of, for example, a bitmap image.

A hash value associated with a block of a second image is calculated (block 820). The hash value can be calculated by the hash value calculator 230 shown in FIG. 2A, and/or the hash value can be calculated using, for example, the methods described in connection with FIGS. 3A through 3C. In some embodiments, the hash value can be calculated based on pixel values associated with pixels of, for example, a bitmap image, or another type of image.

The hash value of the block of the second image is matched with a hash value from the set of hash values associated a block from the set of block values of the first image (block 830). The comparison used to determine that the hash value of the block of the second image matches with the hash value associated with the first image can be performed by the hash value comparator 240 shown in FIG. 2A.

In response to the matching, the block of the second image is identified as a matching block (block 840). The identification as a matching block can be performed by the hash value comparator 240 shown in FIG. 2A.

A size of the matching block of the second image is increased based on a comparison of pixel values outside of the matching block of the second image with pixel values outside of the block from the set of block values of the first image (block 850). In some embodiments, the pixel values that are compared can be adjacent to (e.g., contiguous with) the matching block. The expansion of the matching block can be performed by, for example, expansion module 250 of matching module 210 shown in FIG. 2A. In some embodiments, additional regions (or portions thereof) around the matching block of the second image that are matched with corresponding portions around the block associated with the first image can be used to increase the size of the matching block of the second image. In some embodiments, boundaries (e.g., edges) of a matching region (when increasing the size of the matching block) can be identified when portions outside of the matching block of the second image no longer match with portions of the first image.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output.

Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A non-transitory computer-readable storage medium storing instructions that when executed cause a host device to perform a process, the instructions comprising instructions to:

calculate a set of hash values associated with a set of blocks of a first image within a stream of images of a remote desktop session between the host device and a client device;

calculate a hash value associated with a block of a second image within the stream of images of the remote desktop session;

receive an indicator that the hash value of the block of the second image matches a hash value from the set of hash values associated with the first image; and designate, in response to the indicator, the block of the second image for duplication at a position specified for the block within the second image, the position being based on movement of the block between the first image and the second image.

2. The computer-readable storage medium of claim 1, wherein the block of the second image is a first block of the second image, the instructions further comprising instructions to:

calculate a hash value associated with a second block of the second image;

receive an indicator that the hash value of the second block of the second image does not match any of the hash values from the set of hash values associated with the first image; and designate at least a portion of the second block of the second image for encoding.

3. The computer-readable storage medium of claim 1, further comprising instructions to:

send an offset value of the block of the second image in response to the designation of the block of the second image for duplication.

4. The computer-readable storage medium of claim 1, wherein the hash value from the set of hash values is associated with a block from the set of blocks, the instructions further comprising instructions to:

calculate an offset value of the block of the second image from the block from the set of blocks of the first image, the block of the second image is designated for duplication at a location specified based on the offset value.

5. The computer-readable storage medium of claim 1, wherein the hash value associated with the block of the second image is calculating using a rolling hash value calculation procedure.

6. The computer-readable storage medium of claim 1, wherein the hash value from the set of hash values is associated with a block from the set of blocks, the instructions further comprising instructions to:

increase a size of the block of the second image that is designated for duplication based on a comparison of pixel values outside of the block of the second image with pixel values outside of the block from the set of block values of the first image.

7. The computer-readable storage medium of claim 1, further comprising instructions to:

define an instruction configured to trigger access, from a memory at a client device, an encoded version of the block of the second image in response to the designation of the block of the second image for duplication.

8. The computer-readable storage medium of claim 1, wherein the first image and the second image define a portion of a stream of images associated with a remote desktop session between the host device and a client device.

9. The computer-readable storage medium of claim 1, wherein the first image and second image are non-consecutive images within a stream of images associated with a remote desktop session between the host device and a client device.

10. The computer-readable storage medium of claim 1, wherein a hash value calculation pattern of a block window used to calculate the set of hash values associated with the set of blocks of the first image is different from a hash value calculation pattern of a block window used to calculate the hash value associated with the block of the second image.

11. An apparatus, comprising:

a hash value calculator configured to calculate a set of hash values associated with a set of blocks of a first image within a stream of images of a remote desktop session between a host device and a client device, and configured to calculate a hash value associated with a block of a second image within the stream of images of the remote desktop session;

a hash value comparator configured to match the hash value of the block of the second image with a hash value from the set of hash values associated a block from the set of block values of the first image, and configured to identify the block of the second image as a matching block in response to the matching;

an expansion module configured to increase a size of the matching block of the second image based on a comparison of pixel values outside of the matching block of the second image with pixel values outside of the block from the set of block values of the first image; and an encoding selector configured to determine a position of the matching block within the second image based on movement of the matching block between the first image and the second image.

12. The apparatus of claim 11, wherein the block of the second image is at a position within the second image offset from a position of the block of the first image.

13. The apparatus of claim 11, wherein the hash value calculator is configured to calculate at least a portion of the hash values from the set of hash values associated with the first image are calculated based on a previously calculated hash value from the set of hash values associated with the first image.

14. The apparatus of claim 11, wherein the matching block defines a shape that has a number of sides that is increased after being increased in size.

15. The apparatus of claim 11, further comprising:

an encoding selector configured to designate, after the size of the matching block is increased, a region outside of the matching block for encoding.

16. The apparatus of claim 11, wherein the hash value associated with the block of the second image is a hash value associated with a first block of the second image, the hash value calculator is configured to calculate a hash value associated with a second block of the second image, the hash value comparator is configured to determine that the hash value associated with the second block of the second image does not match any of the hash values from the set of hash values associated with the set of blocks of the first image, the apparatus further comprising:

a hash value selector configured to designate the second block of the second image for encoding.

17. A non-transitory computer-readable storage medium storing instructions that when executed cause a processor to perform a process, the instructions comprising instructions to:

calculate a first hash value of an image within a stream of images of a remote desktop session between a host device and a client device based on a block of pixel values of the image;

calculate a second hash value of the image within the stream of images of the remote desktop session based on a set pixel values vertically aligned and adjacent to the block of pixel values and based on the first hash value;

calculate a third hash value of the image based on a set pixel values horizontally aligned and adjacent to the block of pixel values and based on the first hash value;

calculate a hash value of a current image based on a block of pixel values of the current image, the current image subsequent to the image as a prior image within a stream of images;

compare the hash value of the current image with at least one of the first hash value, the second hash value, or the third hash value;

identify the block of pixel values of the current image as a matching block when the hash value of the current image matches the at least one of the first hash value, the second hash value, or the third hash value; and determine a position of the matching block within the current image based on movement of the matching block between the prior image and the current image.

18. The computer-readable storage medium of claim 17, wherein the second hash value is calculated based on a first subset of the pixel values of the block of pixel values associated with the first hash value, the third hash value is calculated based on a second subset of the pixel values of the block of pixel values associated with the first hash value, the first subset of pixel values being different from the second subset of pixel values.

19. The computer-readable storage medium of claim 17, further comprising instructions to:

calculate a fourth hash value of the image based on the second hash value and the set of pixel values vertically aligned and adjacent to the block of pixel values.

20. The computer-readable storage medium of claim 17, wherein the image is from a stream of images associated with a remote desktop session between a host device and a client device.

* * * * *